United States Patent [19]

Chen

[11] Patent Number: 5,583,684
[45] Date of Patent: Dec. 10, 1996

[54] LENS ASSEMBLY FIXING DEVICE OF SCANNER

[75] Inventor: James Chen, Nantow, Taiwan

[73] Assignee: Spot Technology Inc., Hsin Chu, Taiwan

[21] Appl. No.: 470,593

[22] Filed: Jun. 6, 1995

[51] Int. Cl.⁶ .............................................. G02B 26/08
[52] U.S. Cl. .................. 359/196; 359/197; 359/198; 359/205
[58] Field of Search ....................... 359/196, 197, 359/198, 201, 205, 209, 210, 211, 212, 215, 225, 226

[56] References Cited

U.S. PATENT DOCUMENTS

| | | | |
|---|---|---|---|
| 5,184,245 | 2/1993 | Murakami et al. | 359/196 |
| 5,195,148 | 3/1993 | Sugiura | 359/205 X |
| 5,200,849 | 4/1993 | Inagaki et al. | 359/196 |
| 5,216,550 | 6/1993 | Rudeen | 359/795 |
| 5,299,051 | 3/1994 | Hirano | 359/216 |
| 5,337,182 | 8/1994 | Tomita | 359/217 |
| 5,369,521 | 11/1994 | Yoshino | 359/196 |
| 5,401,948 | 3/1995 | Krichever et al. | 359/205 |
| 5,477,372 | 12/1995 | Ota | 359/196 X |

*Primary Examiner*—Brian Healy
*Attorney, Agent, or Firm*—Jacobson, Price, Holman & Stern, PLLC

[57] ABSTRACT

A lens assembly fixing device of scanner, wherein the scanner includes a body, a top cover, an upper surface plate and a scanning lens assembly. The scanning lens assembly is set inside the scanner and can move to and fro horiziontally and longitudinally therein. At a desired location of a side of the lens assembly is mounted a positioning board having a diamond-shaped opening thereon, and a socket and a spring bolt are installed on the upper surface plate and the top cover respectively, corresponding to the top of the diamond-shaped opening when the scanner is in standby mode. It prevents the lens assembly from being damaged by collision generated during its sliding randomly at removal, as a result from that the spring bolt inserts into the diamond-shaped opening on the positioning board through the socket on the upper surface plate when the scanner stops operation. The locking of the spring bolt will automatically be released, as soon as the top cover is opened in each use or operation.

1 Claim, 3 Drawing Sheets ize: 5,583,684

LENS ASSEMBLY FIXING DEVICE OF SCANNER

BACKGROUND OF THE INVENTION

The present invention relates to a lens assembly fixing device of scanner, and relates more particularly to a safety structure for keeping the lens assembly in the scanner fixed while removal of the scanner. It shall be able to lock the lens assembly and dislodge it automatically at the next operation.

According to the regular lens assembly fixing method and structure, a screw is set in a suitable position at the bottom of the scanner to enable it to just lock the scanner when it stops working so that the lens assembly inside will not slide to get damaged by collision when the mechanism is moved around. However the shortcoming of regular fixing method and structure lies in that the common owners and users often forget to release the lock after locking it for removal and operate the scanner directly causing the mechanism to fail to operate normally and even damaging the driving mechanism. Especially the common users basically do not know the existence of such a construction. Hence often they do not know that they should loosen the above mentioned locking screw when they use it right after buying the set or lock the lens assembly inside the scanner at the next transport to ensure safety.

SUMMARY OF THE INVENTION

It is the main object of the present invention to provide a scanning lens assembly fixing device without the necessity of using any implement when it is in use to complete the fixing quickly and simply and an automatic lock releasing gadget which functions when the top cover is opened at the next operation.

The scanner consists of a body, a top cover, an upper surface plate and a scanning lens assembly. The scanning lens assembly is installed inside the body, capable of moving to and fro horizontally and longitudinally. In order to achieve the objects set forth, primarily a positioning board having a diamond-shaped opening cut thereon is disposed in a desired location at one side of the scanning lens assembly. A socket and a spring bolt are provided on the upper surface plate and the top cover respectively, corresponding to the top of the diamond-shaped opening, when the lens assembly is in standby mode on. The spring bolt is pivoted at the bottom of the top cover with a free end so as to nestle to the bottom surface of the top cover.

The user is only required to set right the spring bolt slightly (downwards vertically) when the scanner is not operating and close the top cover at the same time enabling the spring bolt to insert into the diamond-shaped opening on the positioning board through the socket to complete the operation of fixing the lens assembly in order to prevent the lens assembly from being damaged by collision generated from random sliding during transportation, and later it is only required to open the top cover when using the scanner again so that the spring bolt can resume to the status of attaching firmly to the top cover by means of its spring force slightly to cause the present invention immediately to return automatically back to the unlocked status in order to facilitate application and ensure the mechanism to be in the serviceably safe status.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
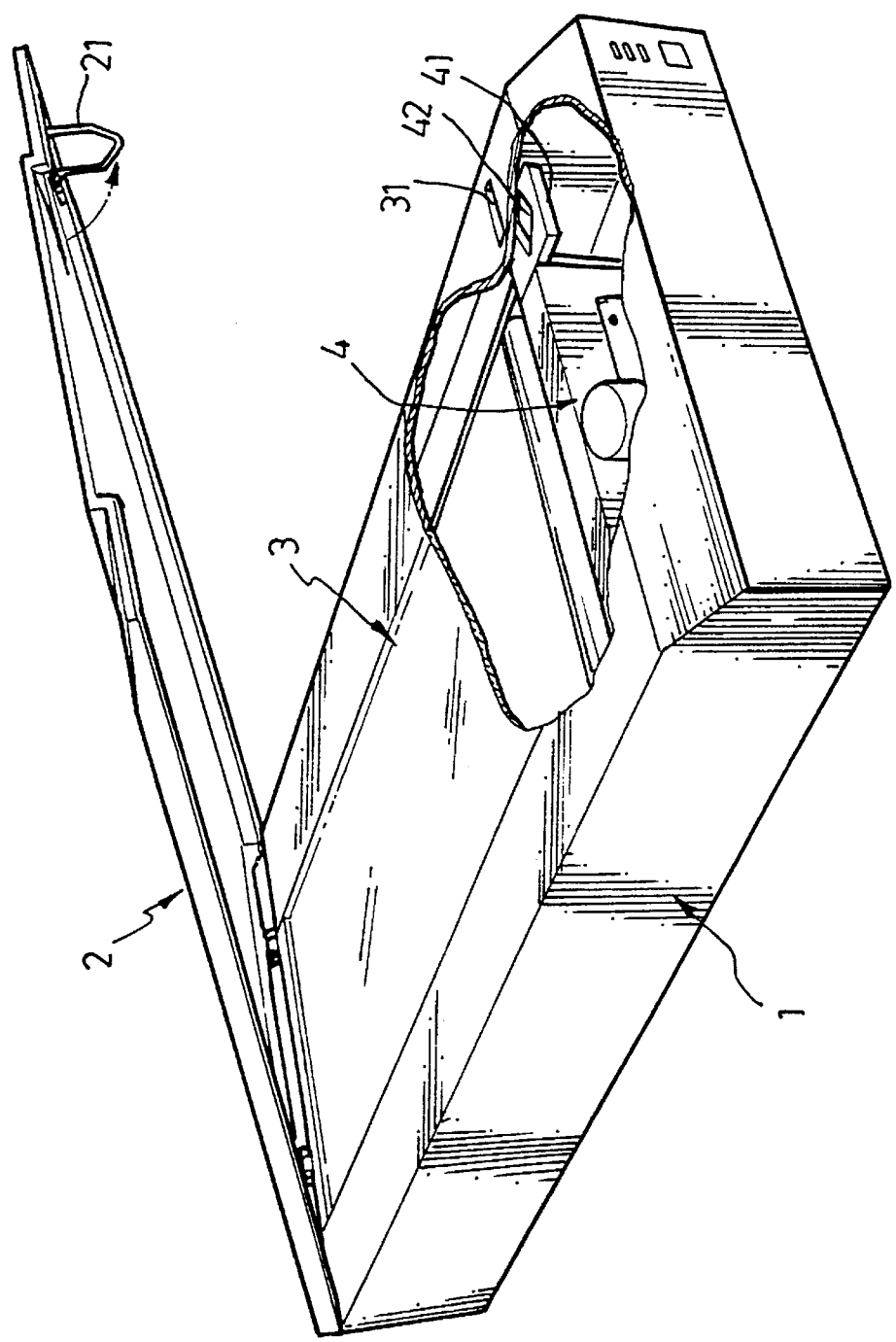
FIG. 1 is a perspective view of the lens assembly fixing device of scanner according to the present invention.

Referring to FIG. 1, the lens assembly fixing device of scanner, where the scanner is composed of a body 1, a top cover 2, an upper surface plate 3 and a scanning lens assembly 4. The scanning lens assembly 4 is provided inside the body 1, capable of moving to and fro in the horizontal direction longitudinally. The present invention provides a fixing device to be used to fix the scanner.

Figure 2:
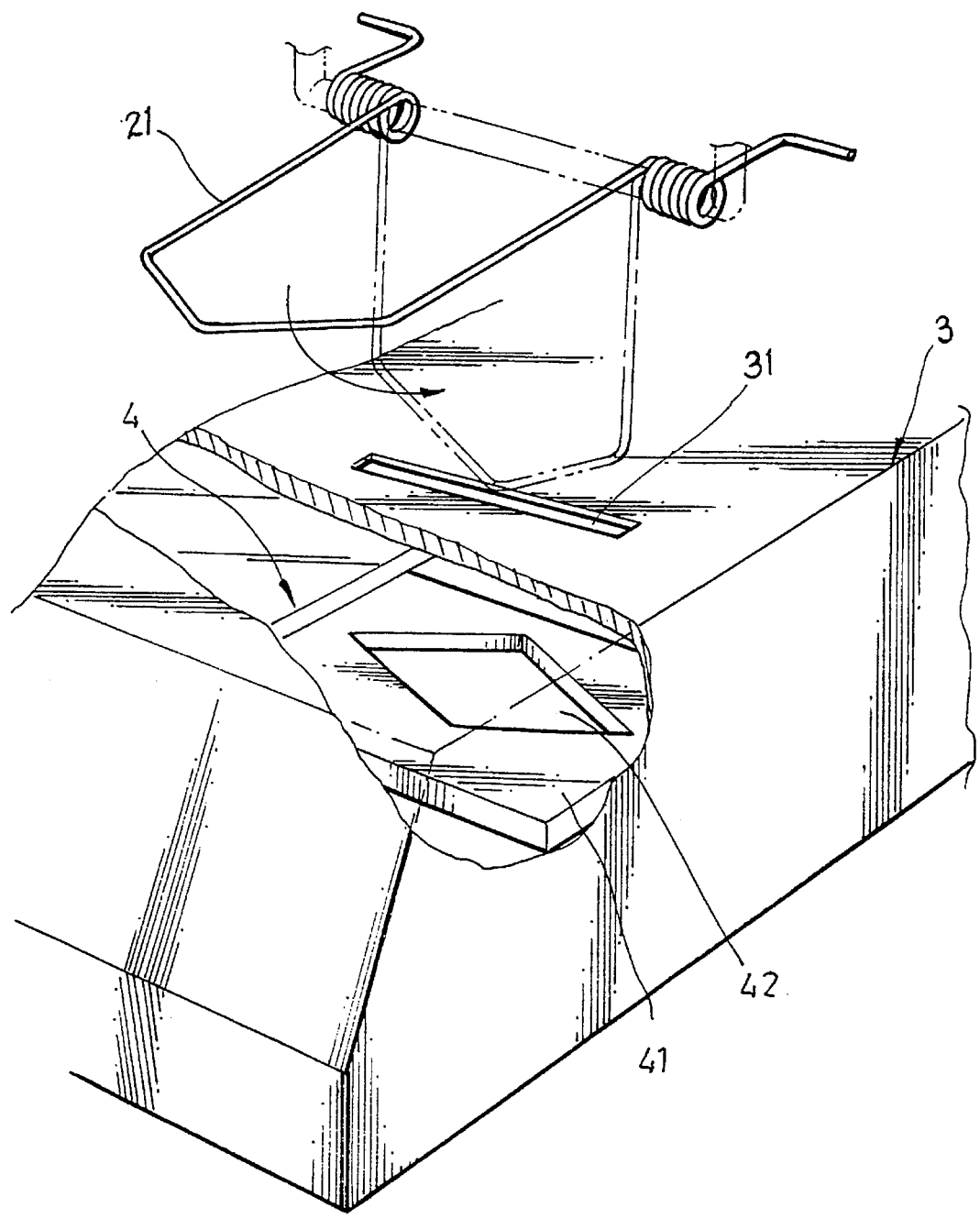
FIG. 2 is an exploded view of the lens assembly fixing device of scanner shown in FIG. 1.
Figure 3:
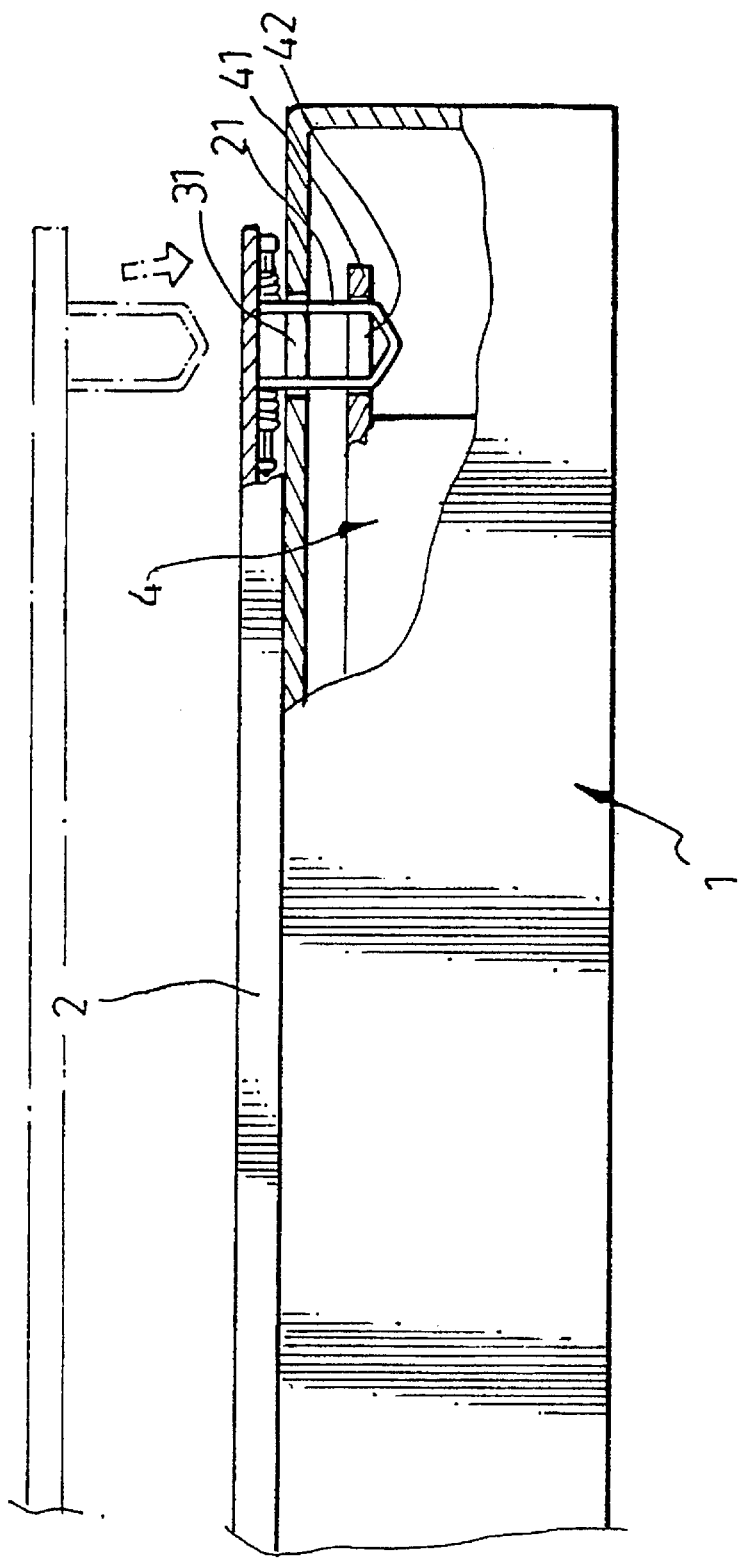
FIG. 3 is a sectional view of the lens assembly fixing device of scanner shown in FIG. 1.

Referring to FIGS. 2 and 3, a positioning board 41 is provided in a suitable location at one side of the scanning lens assembly 4. A diamond shaped opening 42 is cut on the positioning board 41. A socket 31 and a spring bolt 21 are provided respectively on the upper surface plate 3 and the top cover 2, corresponding to the top of the diamond shaped opening 42, when the lens assembly 4 is in standby mode (namely the set is at rest position). The spring bolt 21 is pivoted at the bottom face of the top cover 2 with a free end which is in U shape, and by virtue of the spring force of the pivoted end, the free end is able to nestle firmly to the bottom surface of the top cover 2.

Based on the above, the scanning lens assembly 4 inside the scanner can restore immediately back to the position ready for next operation when the scanner completes scanning or stops operation. Meanwhile the user needs only to apply force slightly to set right the spring bolt 21 (vertically downwards) and sametime close the top cover 2 to enable the spring bolt 21 to insert into and fixed with the diamond-shaped opening 42 on the positioning board 41 mounted at one side of the lens assembly 4 with the free end of the spring bolt 21 through the socket 31 on the upper surface plate 3. Also due to the insertion end of the spring bolt 21 being U-shaped matching its corresponding diamond-shaped opening 42, hence even if the stop position of the lens assembly 4 is slightly erroneous, the fixing operation of the lens assembly 4 can be easily accomplished and the lens assembly 4 can be prevented from being damaged due to random sliding produced during transportation. Later when it is required to use the scanner again, the only operation required by the present invention is to open the top cover 2. By virtue of the springing of the pivoted end itself, the spring bolt 21 will restore back automatically to the state of flatly nestled to the bottom surface of the top cover 2 after dislodging from the diamond-shaped opening 42 and socket 31, so as to render the present invention to appear in the unlocked status immediately and automatically to ensure that the mechanism is safe for use avoiding the generation of shortcoming of momentarily forgetting to lock or release the fixing device as previously mentioned and commonly known construction.

It is to be understood that the drawings are designed for purposes of illustration only, and are not intended as a definition of the limits and scope of the invention disclosed.

What is claimed is:

1. A lens assembly fixing device of scanner wherein the scanner comprising a body, a top cover, an upper surface plate and a scanning lens assembly; said scanning lens assembly being installed inside said body, capable of moving to and fro horizontally and longitudinally, characterized in that a positioning board is mounted at a desired location of said scanning lens assembly with a diamond-shaped opening cut thereon; a socket and a spring bolt are provided on said upper surface plate and said top cover respectively, corresponding to the top of said diamond-shaped opening when said lens assembly is in standby mode; said spring bolt is pivoted at the bottom of said top cover with a free end which is in U shape, so as to nestle to the bottom of said top cover.

* * * * *